(12) United States Patent
Dias et al.

(10) Patent No.: US 8,078,514 B2
(45) Date of Patent: Dec. 13, 2011

(54) DOUBLE-BLIND FINANCIAL SERVICES INFORMATION MARKETPLACE

(75) Inventors: Daniel Dias, Boston, MA (US); John Fawcett, Jr., Dover, MA (US)

(73) Assignee: Advent Software, Inc., San Francisco, CA (US)

( * ) Notice: Subject to any disclaimer, the term of this patent is extended or adjusted under 35 U.S.C. 154(b) by 642 days.

(21) Appl. No.: 12/099,963

(22) Filed: Apr. 9, 2008

(65) Prior Publication Data
US 2008/0255978 A1    Oct. 16, 2008

Related U.S. Application Data

(60) Provisional application No. 60/922,482, filed on Apr. 9, 2007.

(51) Int. Cl.
*G06Q 40/00* (2006.01)
(52) U.S. Cl. ........................................ 705/35
(58) Field of Classification Search .............. 705/35
See application file for complete search history.

(56) References Cited

U.S. PATENT DOCUMENTS

| | | | | |
|---|---|---|---|---|
| 5,754,938 | A * | 5/1998 | Herz et al. | 725/116 |
| 6,363,488 | B1 * | 3/2002 | Ginter et al. | 726/1 |
| 7,333,952 | B1 * | 2/2008 | Neyman et al. | 705/37 |
| 7,403,906 | B2 * | 7/2008 | Coleman | 705/14.66 |
| 2004/0024638 | A1 * | 2/2004 | Restis | 705/14 |
| 2004/0024692 | A1 * | 2/2004 | Turbeville et al. | 705/38 |
| 2006/0173769 | A1 * | 8/2006 | Vales | 705/37 |
| 2007/0118394 | A1 * | 5/2007 | Cahoon | 705/1 |

* cited by examiner

*Primary Examiner* — Mary Cheung
*Assistant Examiner* — Daniel L Greene
(74) *Attorney, Agent, or Firm* — Goodwin Procter LLP

(57) ABSTRACT

An information marketplace is provided in which information items are received from various sources. Each item and the item providers carry descriptors that identify various attributes of the information being provided and by whom it is being provided. Requests for information are received from information consumers that are also tagged with attributes describing the consumer and the information being requested. A subset of the information available in the marketplace is provided to the consumer based on a degree of match among the characteristics describing the information, the attributes associated with the provider of the information, and the attributes associated with the consumer without identifying the actionable investment opportunity to the information consumer or identifying the information consumer to the information provider.

8 Claims, 3 Drawing Sheets

DOUBLE-BLIND FINANCIAL SERVICES INFORMATION MARKETPLACE

CROSS-REFERENCE TO RELATED APPLICATIONS

This application claims priority to and the benefits of U.S. provisional patent application Ser. No. 60/922,482, filed on Apr. 9, 2007, the entire disclosure of which is incorporated herein by reference.

FIELD OF THE INVENTION

This invention relates generally to systems and techniques for providing and provisioning information related to investment opportunities.

BACKGROUND

Investment research services are in a critical state of change both in terms of the customers served by the research firms (information buyers) and the structure of the research firms themselves (information sellers). Traditionally, large brokerage firms dominated the market for institutional investment research by providing end-to-end brokerage services for large accounts, while disseminating written work ("research") to smaller accounts.

The increasing allocation of dollars to alternative asset management entities (e.g., hedge funds) is creating a new class of customer that is less concentrated, more diverse in research style, and more demanding with respect to the proprietary focus of the information. At the same time that the market is becoming more challenging to service, electronic exchanges have been placing considerable pressure on the trading commissions that have financed traditional Wall Street research arms. As a result, much of the research that previously generated income for firms has become commoditized.

The transition to the digital domain has affected research firms in ways other than lowering trading commission revenue. For example, information sellers are flooding the marketplace with investment information using various digital solutions to maximize their audience in hopes of offsetting declining commission revenue with revenue from the sale of research information. However, the near zero incremental cost of the delivery of digital information has inundated the market with investment research materials to the point that customers for such data are overwhelmed, and the incremental value of the information is close to zero. Such research is only valuable to a consumer if it attracts a buyer's, and because of the proliferation of sources of information and inability to quickly distinguish actionable information from stale information, most digital information fails to do so. This is partly because otherwise valuable, open channels with no incremental cost of delivery become completely clogged once opened. Information distribution systems that rely on email are unable to capture or hold a buyer's attention, and as a result a buyer's inbox is no longer an effective destination for valuable information, and instead has become a semi-categorized, bulk repository. From the buyer's perspective, the increasingly diverse nature and number of research providers makes it challenging to effectively filter incoming information. The flow of information has become so relentless that it is almost impossible to discern valuable information from chatter.

What is needed, therefore, is a research information marketplace that can effectively capture the buyers interest by increasing the relevancy of the information presented to them while protecting the interests of the sellers by maintaining the value of the data as long as possible.

SUMMARY OF THE INVENTION

The invention provides an effective marketplace for financial market research information that both captures a buyer's attention and protects the seller's interests based on two fundamental, interconnected concepts—information relevancy and limited distribution. It is the intersection of the relevancy and distribution constraints that allows the information to maintain its value to buyers and sellers, therefore creating an efficient information marketplace. As such, the invention provides a novel approach to gathering information from information providers and presenting it to information consumers in a manner that maximizes the value of the information to all parties within the marketplace.

Limiting the distribution of research information (also known as "sell-side" information) protects the interests of the seller because investment research information declines in value with every view by reducing its exclusivity and undermining any proprietary advantage of the information. However, a seller often adopt imprecise filtering mechanisms because he cannot effectively determine what information is relevant to any one particular buyer. Rather than disappoint customers by failing to provide information that may be relevant, the seller instead "over delivers" information—a practice that is compounded by the near zero incremental cost of delivering digital information. Because buyers and sellers of investment research information have not found a way of communicating preferences for such information, the research market has become saturated, reducing the value of research to seller and the value of the digital channel to the market place.

This lack of communication between buyers and sellers of research information is rooted in the idea that buyers are extremely sensitive to privacy. Merely indicating interest in a particular item of information could put a buyer at a disadvantage if other market participants become aware of his interest, allowing others to potentially "front run" his intentions. For example, if a market participant knew that a large buy-side customer (e.g., a large mutual fund company or pension fund) was actively looking at information related to the gold sector or information related to a particular technology, the participant may use that knowledge to speculate that a large market move is imminent based on the anticipated allocation of capital. The key challenge, therefore, in creating a more efficient marketplace for investment research information is overcoming the contradiction of efficient communication and privacy while delivering a relevant subset of information to the appropriate buy-side clients.

The invention uses meta-data to describe both the information available in the marketplace as well as the participants within the marketplace to achieve a balance between privacy and value. Privacy is a fundamental requirement in the market for the buyers of intellectual capital and the limitation of information dissemination is critical to maintain value of the information. Within the marketplace, research characteristics and counterparty attributes provide a framework for determining the relevancy of research information, its appropriateness for a particular buyer, and whether it is ultimately displayed to a buyer (an "impression"). The system can limit the total number of impressions at any one time based on the relevancy of the information and historic activity of the buyer in the marketplace.

The invention also provides a marketplace that can mask buyer's intentions while still allowing only relevant information to be delivered. The system relies on the descriptive meta-data attributed to the counterparties and the research information rather than the counterparties and research themselves. As a result, an information seller does not publish research for a specific account, nor do they have access to the type of research requested by a buyer. Instead, a seller provides meta-data describing the research along with the research information and rules built into the marketplace facilitate the delivery of information to relevant buyers according to the buyer's previously articulated (but confidential) preferences.

BRIEF DESCRIPTION OF THE DRAWINGS

In the drawings, like reference characters generally refer to the same parts or steps throughout the different views. Also, the drawings are not necessarily to scale, emphasis instead generally being placed upon illustrating the principles of the invention.

DETAILED DESCRIPTION

The invention utilizes two meta-data models to determine the relevancy of information items within an information marketplace. A first model describes attributes of the market counterparties (information sellers, such as brokerages and investment banks, information buyers, such as hedge funds, mutual funds, and other buy-side participants). The second model describes attributes of the research information items being offered and consumed in the marketplace. In contrast to conventional techniques for distributing and consuming investment information that rely on either a subscription model (in which case an information provider knew specifically who was receiving the information) or a blast model where every consumer received the information, the invention maintains anonymity of the consumer and value for the provider.

Figure 1:
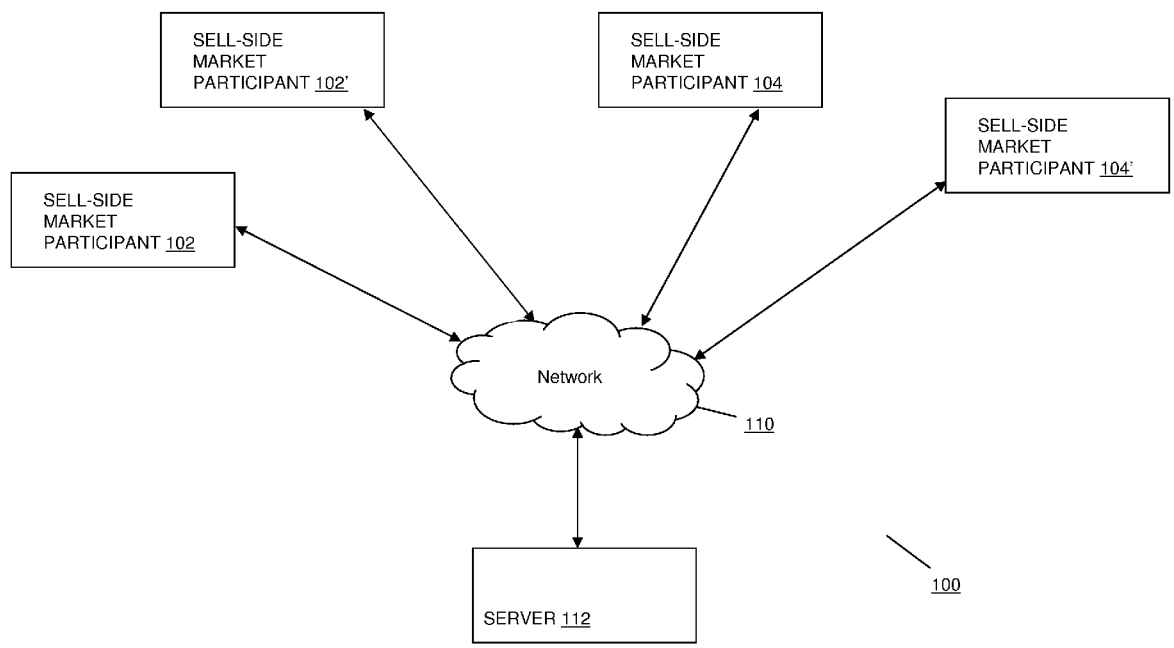
FIG. 1 is a flowchart depicting the steps in one embodiment of the invention.

In general, and referring to FIG. 1, use of the techniques and systems described herein facilitate the creation and operation of a financial information marketplace 100 that links information providers 102, information consumers 104 via an electronic communications network 110. A central server 112 (or in some cases a series of distributed servers) manages information flow throughout the marketplace 100. As shown, the marketplace 100 includes two information providers 102 and 102' and two information consumers 104 and 104', but this is only for exemplary purposes, and it is intended that there can be any number of providers and consumers.

The communications network 110 connects the information providers 102, information consumers 104 and the server 112. The communication may take place via any media such as standard telephone lines, LAN or WAN links (e.g., T1, T3, 56 kb, X.25), broadband connections (ISDN, Frame Relay, ATM), wireless links, and so on. Preferably, the network 110 can carry TCP/IP protocol communications, and HTTP/HTTPS requests made by the web browser and the connection between the market participants and the server 112 can be communicated over such TCP/IP networks. The type of network is not a limitation, however, and any suitable network may be used. Typical examples of networks that can serve as the communications network 110 include a wireless or wired Ethernet-based intranet, a local or wide-area network (LAN or WAN), and/or the global communications network known as the Internet, which may accommodate many different communications media and protocols.

The model for market counterparties is based on how the information consumers, typically institutional buyers 102 (also known as "buy-side" participants) and information providers 104 ("sell-side" participants) interact in the marketplace 100. For example, the charter and structure of a mutual fund (a prototypical buy-side participant) are the primary influences on the relevancy of research data for the fund. This is because, traditionally, funds are benchmarked to sectors, market capitalizations, and/or countries that limit its potential investments to assets that fall within the guidelines of its charter. Mutual fund firms, and others, have strict regulations on the structure of the investment products they can offer, and many forbid certain investment practices such as shorting securities, pairing investments to isolate return characteristics, or buying futures. As a result, attributes of a fund can be applied as a global filter to limit the types of research information seen by those managing or advising the fund. For example, a "long-only" fund that is restricted to U.S. securities should not be presented with research that involves shorting a European company.

Alternative investment vehicles (e.g., hedge funds) generally have fewer restrictions on the types of investments they can pursue, and often initiate research on an investment by focusing on the fund's fundamentals or inherent structure. As an example, a hedge fund manager may be interested in finding a security to short (with less regard to its industry or location) rather than whether a particular security in an index should be underweighted. While the difference is subtle, focusing on the characteristics of the research rather than the investment itself increases the relevancy of investment research information because the language is more expressive.

Such an approach is different from typical research information distribution methods and forums. Conventionally, research sources provide "company-based" research that limits a user to basing research queries on ticker symbols—e.g., an investor interested in industrial machinery must first know all the companies in that sector, and request research on each. As an example, an analyst may subscribe to research for Caterpillar, Inc. (CAT) through a web site or receive alerts via an email distribution list. However, the analyst cannot sign up for research on short ideas in Industrial Goods with a P/E greater than ten—he is forced to subscribe to and review massive amounts of research to find an appropriate investment. The time required to do so adds significant expense to the fund's overhead, and in many cases causes the manager to miss opportunities he could otherwise exploit.

The invention's structure for determining relevancy to the various parties leverages the attributes of counterparties and characteristics of the research itself. As described in greater detail below, characteristics are assigned to research information, and attributes are assigned to both the buyers and sellers of the research information to facilitate an automated matching and distribution of information.

Figure 2:
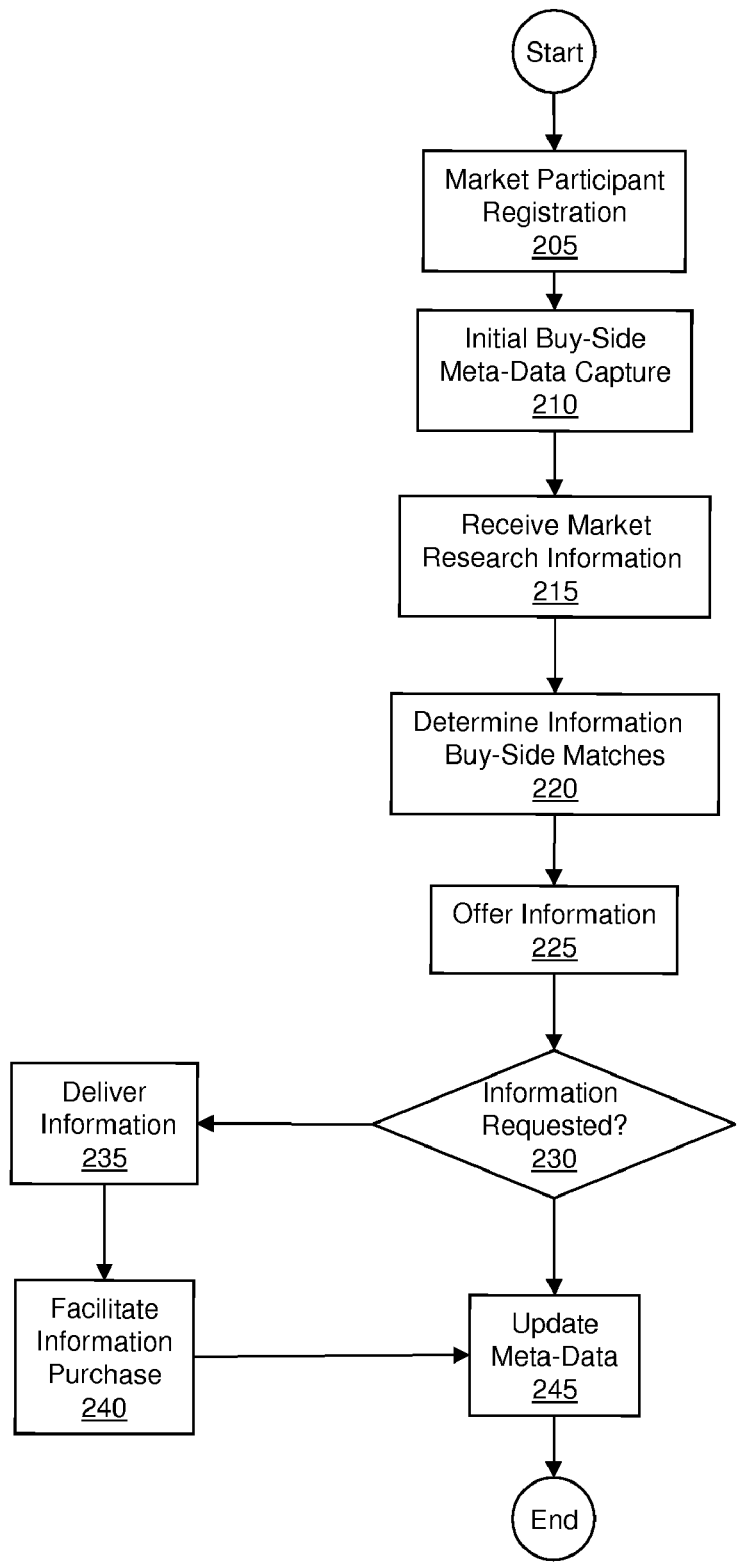
FIG. 2 is a diagram of a financial information marketplace in which the invention operates.

FIG. 2 illustrates, at a high level, a process for delivering research information from information providers to information consumers in one embodiment of the invention. Initially, market participants register (STEP 205) by providing general characteristics (e.g., name, provider/consumer indicator, geography, etc.) which may, in some cases, be used to categorize the participants and filter information provided to or from the participant. Once registered, information consumers may provide additional meta-data and/or attributes (STEP 210) describing information items of interest. Market information is then submitted by information providers (STEP 215). In some cases, attributes and meta-data describing the information is provided with the information, whereas in other instances the meta-data may be provided prior to submission of the information. For example, a sell-side analyst may be interested in distributing a research report on a particular company, and annotate the information with meta-data including the company ticker symbol, a rating (e.g., positive, neutral, negative), position recommendation, etc. The information provider may then submit the meta-data to the market to gauge interest. In this manner, the information itself (i.e., the report) does not have to be submitted, and therefore it remains proprietary, preserving its value.

Still referring to FIG. 2, matches between information consumers' requests (e.g., a recommendation for a mid-cap consumer electronics company with an annual sales increase greater than 10%) and information items are determined (STEP 220). In some instances the matches are determined automatically, whereas in other cases information consumers run queries against the information meta-data and matches are determined in response thereto. In some embodiments, the matching information is not displayed to the consumer— only the meta-data is displayed. The matching information is offered to the consumer (STEP 225), along with any costs, use restrictions or notices pertaining to the information. The consumer may then decide whether to purchase (or license, or subscribe to) the information (STEP 230). Only then is the information delivered (STEP 235). Prior to delivery, the consumer may not know which provider has submitted the information, and in some instances the provider may never know which consumer purchased the information. In such cases, the purchase process may be facilitated (STEP 240) by a central coordinator responsible for operating the marketplace, or, in some cases, a third-party payment processing service such as PayPal. Once completed, details of the transaction may be used to update meta-data related to the consumer (purchased research report regarding IBM), the provider (sold four reports today), and/or the information itself (purchased by three fund managers in the past hour).

Research Characteristics

The characteristics assigned to individual (or groups of) research information are singular, non-self-describing values. For example, a research characteristic may be the service type attributed to the information (i.e., how the information is generated), such as an investment idea, a management meeting, a consulting call, a research report, or a detailed earnings model. More sophisticated, compound characteristics can be built by combining the companies, industries, and people associated with a particular research item. An information consumer can specify one or more characteristics by which to screen for information they wish to receive. As an example, the state in which a company has its headquarters is considered a characteristic of the company. Because it is not unique to the company, it can be used to qualify a company's relevance without revealing a buyer's specific interest. By contrast the street address of a corporate headquarters or a company's ticker symbol are self-describing values and consequently would not be considered a characteristic. Compound characteristics may also refer to topics like Venezuela (for oil companies, for example) or Iraqi War if they are relevant to the fundamentals of the research.

In some embodiments, information consumers can define characteristics for the information providers they wish to receive information from. Such functionality allows an information consumer to selectively screen out (or expressly request) information from different sources without such preferences being known to the information providers.

Certain characteristics may be made available as "standard" characteristics which can be explicitly selected by the information provider when submitting the information and/or by the information consumer when creating a profile. Data such as market capitalization, primary industry, and annual revenue, as non-limiting examples, may be provided and used as criteria for filtering and matching companies and research information.

When entering research information for inclusion in the marketplace, the submitter selects a series of characteristics that she wishes to emphasize in expressing the fundamental framework of the research. One primary characteristic associated with research information is service type. The service type characteristic provides information buyers with a description of the type of research being offered. Examples of "service types" include, but are not limited to a consulting call, a management meeting, a research report, or an investment idea. Each service type is explicitly defined in the market so that both buyer and seller understand the parameters of service they are receiving and delivering, respectively. Because an information consumer provides various company characteristics to describe his interests, research information may also include company identifiers when submitted.

In some instances, service types may also require the entry of some minimal number of parameters prior to submission of the information, and any information provided is validated accordingly. An investment idea, as an example may require the entry of parameters such as exposure, structure, underlying security(s), horizon, and commentary. Some parameters (e.g., exposure and structure) may be selected from a predefined list of variants, whereas others such as horizon and underlying securities determine the total performance of the research, and are used to provide for consistency in evaluating the information.

Counterparty Attributes

In order to facilitate an anonymous interaction between two parties that optimizes the relevance of information exchanged between the parties, certain attributes of each are stored. For example, if an information consumer does not want to receive research related to shorting opportunities or consulting calls, such information items are not displayed, in some cases regardless of provider. Likewise, if an information provider expects a minimum commission for providing research items, only consumers willing to pay such fees are shown the information.

Certain attributes are user-defined and entered upon completion or updating of a market participant's profile. Attributes may be attributed at various levels. For example, attributes may be attributed to an entity (e.g., a company or fund) a group (e.g., an industry-specific research team within a fund complex) and/or an individual (e.g., trader-specific attributes). Where attributes are assigned at multiple levels, the attributes can be combined using Boolean logic (i.e., and'ed or or'ed). In certain embodiments, rules may be defined that indicate how and in what order to apply conflicting attributes. For example, a company that generally does not utilize short selling as an investment approach may indicate in its profile that it is not interested in receiving research regarding shorting, but allow an individual trader tasked with reviewing current short positions to see such information. In such a case, the individual's attribute may override the company attribute and provide the individual with information related to short positions, but still filter such information from other analysts.

The attributes may be stored in a central database, a local database, or some combination of the two. The benefit of storing attributes within a local database is that it allows certain sensitive attributes to remain completely proprietary and hidden from any other information consumer, information provider and the market itself. For example, a fund may maintain an "ignore list" that includes stocks for which the fund is not interested in receiving information, or a "hot list" that includes stocks in which the fund is actively considering increasing its exposure. Another example of a restrictive attribute is a "box list" which lists the counterparties with which the user does not want to transact. In some embodiments, a party may indicate that a "match" between their attributes and those of a counterparty should occur if and only if certain emphasized attributes (or a minimum number) match. Such sensitive information may be kept on local servers to assure users that no other entity can view the data. In some instances, these lists may be generated automatically based on locally-stored portfolio information. By storing certain attributes centrally and others locally, the system provides increased flexibility with respect to where, when and how research information is filtered.

In some instances, the system may automatically generate attributes for market participants. Automatically generated counterparty attributes can be calculated based upon general statistics and/or actions that describe a party's historical activity in the marketplace. For example, actions may indicate the extent to which a party uses the marketplace, interacts with a particular counterparty, purchases research, provides research, etc. Other examples of such statistics include total transactions conducted, research presented (for seller), average return on transaction (for seller's investment ideas), and commission range (for buyer). In some instances, certain activities (e.g., recent activity, purchases of information) may be weighted more heavily than others.

In summary, the information characteristics and counterparty attributes allow users to define what type of research they wish to receive and which research providers they wish to receive it from, while maintaining the anonymous nature of the marketplace.

Using the information characteristics and party attributes, the invention can facilitate the creation of a marketplace for research information in which the value of information is maintained and buyers can limit the research received without sacrificing anonymity. To determine the research information that will be presented to a particular buyer, the information characteristics entered by the buyer are compared with those of the currently available research, resulting in a list of "applicable research." For each applicable research item in the list, the attributes of the information seller is compared with those of the information buyer to determine if they are "compatible" parties. Research provided by an incompatible seller can then be marked and/or removed from the list for that buyer. Over time, the system can track and analyze why certain items fell from the list due to incompatibility and in some cases offer suggestions to buyers or sellers on how to get or sell more research. For example, if a buyer indicates they are only interested in research related to companies listed in the Standard and Poor's 500 Index, information related to small companies will generally not be presented to that user. By providing statistics about the general universe of submitted research items, the system can provide estimates of how much additional information the user would receive should the remove or relax the filters it has placed on certain information characteristics. The result of the compatibility check among market participants yields a list of "available research" for each information buyer, while maintaining the anonymity of the potential buyers from other buyers and the sellers.

Sellers submit research information to the centralized server and assign characteristics based on the type of research, as described above. The research information is then stored at a central server which can apply additional filters to ensure the information meets any global parameters such as timeliness, appropriate content, etc., resulting in a complete research universe.

An additional filter that can be applied prior to the presentation of information to buyers is a "research limitation quotient" which represents the number of research items that can be presented to a buyer at one time. The research limitation quotient can vary by account (e.g., some buyers may "subscribe" for a greater number of concurrent research items) and over time. In order to receive additional research information, a buyer may either accept (i.e., purchase) or decline research once the research limitation has been reached. In some cases, the research limitation can adjust over time in accordance with the buyer's activities in the marketplace. For example, a user that actively purchases a large percentage of the research presented may have the limitation raised to allow a greater number of items to be seen, whereas a buyer that has a high limit but rarely purchases research may have the limit lowered.

The marketplace generates income by, for example, charging subscription fees, per impression fees, submission fees and/or commissions on purchases of information. In the "per-impression" model, each item that is previewed by a buyer generates a fee charged to the research seller. In some implementations, the service merely provides an introduction between the buyer and seller, whereas in other embodiments, the system facilitates the completion of the transaction (e.g., the transfer of funds) between the parties.

Because the system utilizes meta-data (the characteristics and attributes) to "match information to potential buyers, research information can be presented to different buyers with varying degrees of meta data exposed. For example, a seller may advertise an investment idea (e.g., buy a particular stock) without disclosing the underlying investible security—only the characteristics of the investment opportunity. The system will find potential matches among buyers based on the characteristics of the information and attributes of the parties, but because much of the information remains hidden, the seller is relying on its reputation in the marketplace. Research firms that provide high-quality, actionable research information may receive significant interest for the information they submit to the marketplace without having to disclose the particular investment opportunity. This allows the information to retain its value, as only those buyers willing to commit to purchasing the research will have the complete information. In contrast, research firms known for "blasting" the market with a high volume of questionable or varied quality will be required to expose more information about its information to attract buyers.

For example, a research service that performs deep research on specific investment opportunities may cause movement in a particular equity merely by mentioning the equity in a "short report." For this firm to effectively market an idea without affecting the market prior to the buyer of the information being able to act on it, the identity of the security must be hidden from the market until the transaction is completed.

Figure 3:
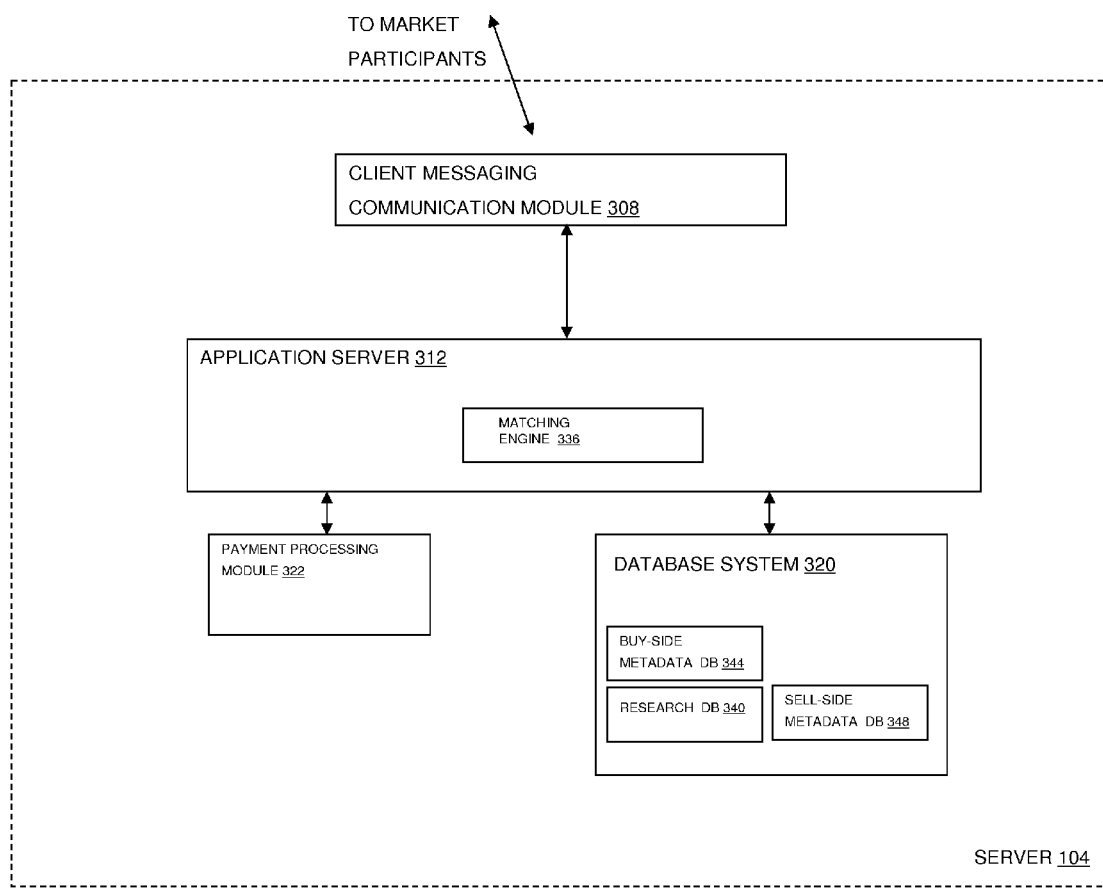
FIG. 3 is a block diagram of an embodiment of the server of FIG. 2.

Referring to FIG. 3, a system for providing the information marketplace using the techniques described above can, in one embodiment, include one or more servers 104, and at least one client used by the market participants to submit, review and/or purchase research information. For example, the clients can be virtually any type of computer workstation connected directly to the server, they can be part of a workgroup that is connected to the server, or, in some cases, connected to a network that is connected to the server. The client is preferably a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client can be such hardware as a smart or dumb terminal, network computer, personal data assistant, wireless device, information appliance, workstation, minicomputer, mainframe computer, or other computing device that is operated as a general purpose computer or a special purpose hardware device solely used for serving as a client in the user authentication system.

Generally, the clients are operated by users of the system to submit, review, and/or purchase information (as well as other functions) and may include client software to implement any of the functions described above, such as the filtering of research based on attributes and characteristics.

In one embodiment, the server 104 includes four components: a client messaging communications module 308, an application server 312, a database system 320, and a payment processing module 322. The client messaging communication module 308 provides an interface for communication among the market participants and the server involving HTTP/S requests and responses, Java messages, SMTP messages, POP3 messages, instant messages, as well as other electronic messages. In some instances, messages may be transferred from the clients to the server 104, from the server 104 to the clients, or both. The client messaging communication module 308 can be implemented as software running on one or more servers, or may be implemented as a stand-alone server.

The client messaging communication module 308 communicates with the application server 312, which provides the main programming logic for the operation of the system. In one embodiment, the application server 312 is implemented as one or more application programs running on a server class computer, which may be the same or different computer as the client messaging communication module 308. The application server 312 receives requests for submission or receipt of information items from market participants via the client messaging communication module 308.

In one embodiment, the application server 312 includes a matching engine 336 that compares meta-data submitted by the sell-side participants related to information items offered and the meta-data describing information desired by the buy-side participants. The application server 312 also facilitates the receipt, calculation and storage of the various attributes, characteristics and statistics regarding the research information and the market participants, some or all of which may be stored in one or more databases 320 (either centrally located on the server, distributed among the clients, or some combination thereof). The database system 320 also stores data related to the investment information 340, buy-side market participants 344 and sell-side market participants 348. The database server 320 provides data to the application server 312 necessary for operation of the system. Examples of database applications that may provide such services include the MySQL Database Server by Sun Microsystems of Santa Clara, Calif., the PostgreSQL Database Server by the PostgreSQL Global Development Group of Berkeley, Calif., or the ORACLE Database Server offered by ORACLE Corp. of Redwood Shores, Calif.

Some or all of functionality described above may be supplied and/or performed by a client-resident agent residing on one or more of the clients in communication with the server. In one embodiment, the agent implements the processes described above as a process running in RAM on a workstation in communication with the server. For example, when a market participant requests relevant research, the agent receives all (or some subset) the available research information and applies one or more filters, resulting in the relevant research for that client.

The modules described throughout the specification can be implemented in whole or in part as a software program using any suitable programming language or languages (C++, C#, java, LISP, BASIC, PERL, etc.) and/or as a hardware device (e.g., ASIC, FPGA, processor, memory, storage and the like).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computer-implemented method for facilitating the exchange of investment research information among information providers and information users, the method comprising:

receiving, at a client messaging server, a plurality of research information items from a plurality of information providers, each item comprising information describing an actionable investment opportunity and one or more characteristics describing the actionable investment opportunity;

attributing, at an application server using a matching engine, one or more seller attributes to each of the information providers;

receiving, at the client messaging server, a request for research information from a consumer of research information, the information consumer having one or more consumer attributes associated therewith and wherein the request is limited to non-self-describing values such that the request does not reveal a specific interest of the information buyer submitting the request;

providing, via the client messaging server, a subset of the research information items to the information consumer based in part on a degree of match among the characteristics describing the actionable investment opportunity, the request, the attributes associated with the information provider and the attributes associated with the information consumer without identifying the actionable investment opportunity to the information user or identifying the identity of the information consumer to the information provider.

2. The method of claim 1 further comprising facilitating an economic transaction between the information provider and the information consumer such that the information user provides payment to the information provider in exchange for receiving the actionable investment opportunity.

3. The method of claim 2 further comprising exposing the actionable investment opportunity to the information consumer upon completion of the economic transaction.

4. The method of claim 1 wherein the information providers comprise sell-side financial institutions and the information consumer comprises a buy-side financial institution.

5. The method of claim 1 wherein the information providers comprise sell-side financial institutions.

6. The method of claim 3 further comprising withholding the identity of the information user from the information provider subsequent to exposing the actionable investment opportunity to the information consumer.

7. A system for facilitating the exchange of investment research information among information providers and information consumers, the method comprising:

a client messaging server for receiving (i) research information items from a plurality of information providers, each item comprising information describing an actionable investment opportunity and one or more characteristics describing the actionable investment opportunity and (ii) a request for research information from a research information consumer, the information consumer having one or more buyer attributes associated therewith and wherein the request is limited to non-self-describing values such that the request does not reveal a specific interest of the information consumer submitting the request;

a matching engine for matching one or more seller attributes to each of the information providers;

an application server for identifying a subset of the research information items to be provided to the information consumer based in part on a degree of match among the characteristics describing the actionable investment opportunity, the request, the attributes associated with the information provider and the attributes associated with the information consumer without identifying the actionable investment opportunity to the information consumer or identifying the information consumer to the information provider.

8. The system of claim 7 further comprising a payment processing module for facilitating an transaction between the information provider and the information user such that the information consumer provides payment to the information provider in exchange for receiving the actionable investment opportunity.

* * * * *